United States Patent
Bartek

(10) Patent No.: US 11,618,345 B2
(45) Date of Patent: Apr. 4, 2023

(54) THIRD RAIL RAILWAY COVER BOARD

(71) Applicant: Protran Technology, LLC, West Columbia, SC (US)

(72) Inventor: Peter M. Bartek, Ledgewood, NJ (US)

(73) Assignee: PROTRAN TECHNOLOGY, LLC, West Columbia, SC (US)

( * ) Notice: Subject to any disclaimer, the term of this patent is extended or adjusted under 35 U.S.C. 154(b) by 596 days.

(21) Appl. No.: 16/552,518

(22) Filed: Aug. 27, 2019

(65) Prior Publication Data
US 2020/0070685 A1   Mar. 5, 2020

Related U.S. Application Data

(60) Provisional application No. 62/727,353, filed on Sep. 5, 2018.

(51) Int. Cl.
*B60M 1/04* (2006.01)
*B60M 1/30* (2006.01)

(52) U.S. Cl.
CPC ............. *B60M 1/04* (2013.01); *B60M 1/30* (2013.01)

(58) Field of Classification Search
CPC .................................. B60M 1/04; B60M 1/30
See application file for complete search history.

(56) References Cited

U.S. PATENT DOCUMENTS

| | | | |
|---|---|---|---|
| 702,986 A * | 6/1902 | McIntosh | B60M 1/04 191/30 |
| 746,556 A | 12/1903 | Moran | |
| 799,110 A | 9/1905 | Taylor | |
| 1,813,199 A | 7/1931 | Rogers | |

(Continued)

FOREIGN PATENT DOCUMENTS

| | | |
|---|---|---|
| CN | 203245677 U | 10/2013 |
| CN | 207289612 U | 5/2018 |

(Continued)

OTHER PUBLICATIONS

International Search Report and Written Opinion issued in corresponding International Patent Application No. PCT/US2019/049534 dated Jun. 9, 2020.

(Continued)

*Primary Examiner* — Robert J McCarry, Jr.
(74) *Attorney, Agent, or Firm* — Norton Rose Fulbright US LLP

(57) ABSTRACT

This invention relates to a portable, lightweight, non-conductive, and non-flammable hard lightweight cover that is placed over a third rail and used to protect workers from being electrocuted while working near live powered third rail system. Further, the third rail railway cover board may be highly visible and made to work in all weather conditions. Because of the simplicity of installation, no special power expert is needed to install the third rail railway cover board which will save a great deal of time and safety. The third rail railway cover board may include one or more of the following features: lightweight, non-conductive, and flame retardant; placed over high voltage third rail; weather and rain resistant; high-visibility; stackable; locking mechanism from one cover to an adjacent cover; LED light holder; contoured shape to fit all US third rail systems; and water shed design.

20 Claims, 4 Drawing Sheets

(56) References Cited

U.S. PATENT DOCUMENTS

| | | | |
|---|---|---|---|
| 1,813,200 | A | 7/1931 | Rogers |
| 3,927,742 | A | 12/1975 | Reynolds et al. |
| 5,315,068 | A | 5/1994 | Barron et al. |
| 7,926,634 | B1 * | 4/2011 | Morales ............... B60M 1/307 191/32 |
| 2017/0320404 | A1 | 11/2017 | Steininger | |

FOREIGN PATENT DOCUMENTS

| | | | |
|---|---|---|---|
| GB | 337598 | 11/1930 | |
| GB | 2428723 | 2/2007 | |
| GB | 2428723 A * | 2/2007 | ............... B60M 1/04 |

OTHER PUBLICATIONS

Website: Sunkey FRP, "Protective Hood System for the Third Rail," <https://www.sunkeyfrp.com/watertanks/protective_third_rail.html>, Jul. 30, 2018, Dongyue Industry Co., Ltd., Hengshui City, Hebei CN.

Website: Alibaba, "Anti UV Fiberglass Pultrusion Rail Profile in GRP FRP," https://www.alibaba.com/product-detail/anti-uv-fiberglass-pultrusion-rail-profile_547173552.html?spm=a2700.7724857.normalList.60.54471c14dljUqj>, Jul. 30, 2018, Alipay, Lazada, INA.

Website: Vortok International, "Third Rail Covers," <http://www.psmhire.co.uk/hire/rail-equipment/rail-equipment/third-rail-shroud/3664/>, Jul. 30, 2018, Abnix Solutions Ltd., Blackfen, Kent, UK.

Website: REHAU, "Rail Shroud," <https://www.rehau.com/gb-en/industrial-solutions/transportation/rail/rail-shroud#tab1>, Jul. 30, 2018, REHAU Ltd., Muri, Switzerland.

Website: REHAU, "Conductor Rail Cover Systems for Underground and Suburban Railways," <https://www.rehau.com/group-en/railway-systems/conductor-rail-covers>, Jul. 30, 2018, REHAU Ltd., Muri, Switzerland.

Website: Alibaba, "Third Rail FRP GRP Protection Cover With Checking Window," <https://www.alibaba.com/product-detail/Third-Rail-FRP-GRP-Protection-Cover_60678876946.html?spm=a2700.7724857.normalList.9.54471c14fkBybS&s=p>, Jul. 30, 2018, Alipay, Lazada, INA.

Website: Alibaba, "Fiberglass FRP Rail Cover made by Pultrusion Process," <https://www.alibaba.com/product-detail/Fiberglass-FRP-Pultruded-Profile_1414311988.html?spm=a2700.7724857.normalList.28.54471c14cJmub7>, Jul. 30, 2018, AliExpress, Lazada, INA.

Website: Speedy Services, "Permaquip Rail Shroud," <https://www.speedyservices.com/35_1790-h-permaquip-rail-shroud>, Jul. 30, 2018, Speedy Hire Plc., Merseyside, UK.

Website: Kiddle Co, "Third Rail Facts," <https://kids.kiddle.co/Third_rail>, Jul. 30, 2018, Kiddle Encyclopedia, Kiddle.co.

Website: Fiberglass Solutions, "CTA Third Rail Cover," <http://fiberglasssolutions.biz/electrical.php>, Jul. 30, 2018, Fiberglass Solutions, Addison, IL.

* cited by examiner

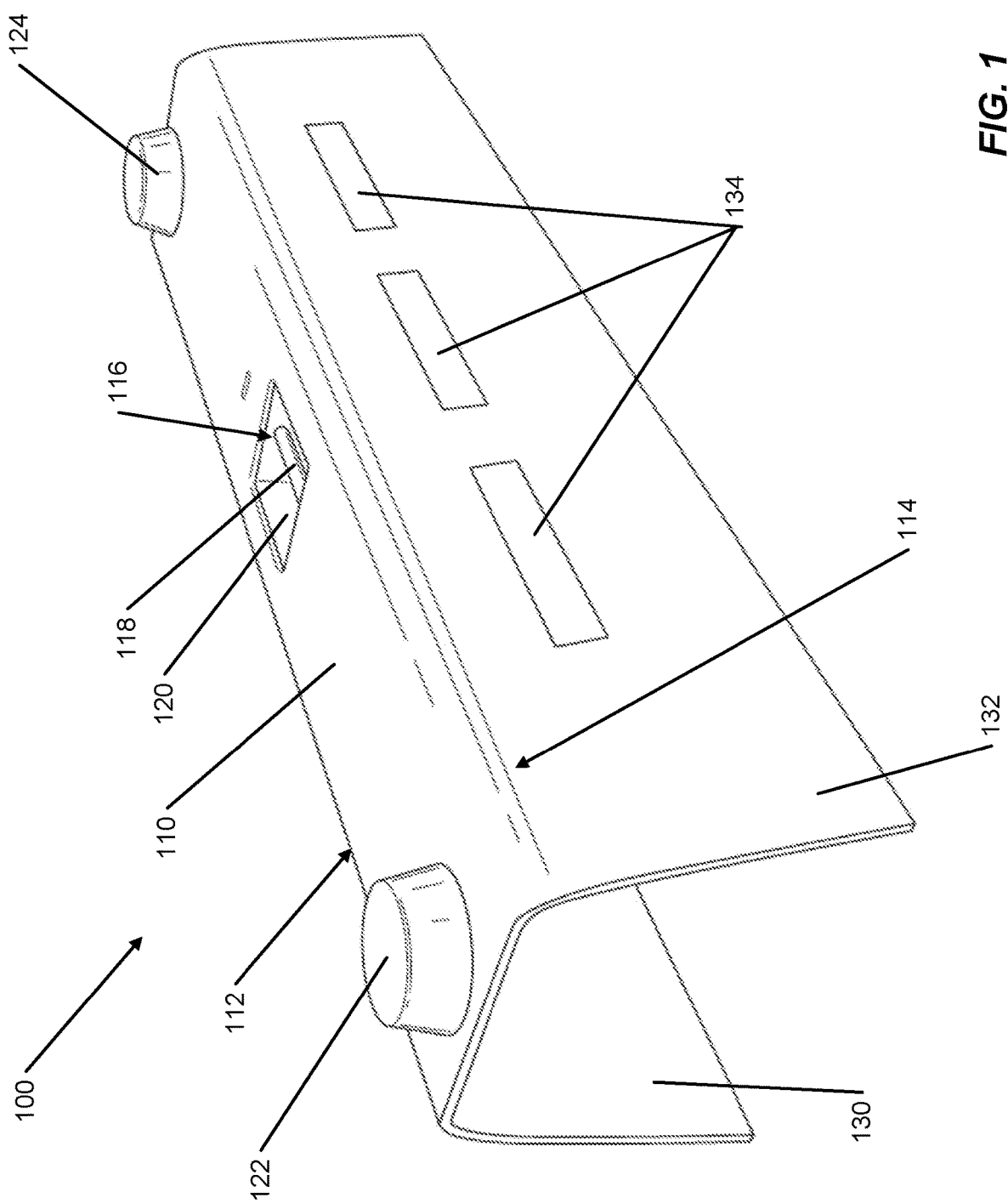

THIRD RAIL RAILWAY COVER BOARD

CROSS-REFERENCE TO RELATED APPLICATIONS

This application claims priority to U.S. Provisional Patent Application No. 62/727,353, filed Sep. 5, 2018, entitled Third Rail Railway Cover Board, which is incorporated herein by reference in its entirety and made a part hereof.

FIELD OF THE INVENTION

The present invention relates rail systems, and, more particularly, to a portable lightweight, highly visible, non-conductive and non-flammable hard cover that is placed over a third rail and used to protect workers from being electrocuted while working near live powered third rail system.

BACKGROUND

Currently, railroads that have a third rail system either work around the third rail under live conditions or utilize a special heavy weight mat. When the special heavy weight mat is used, the mat needs a certified power expert to wrap around the third rail. These actions cause many hours of delay. If no third rail protection is utilized, dangerous conditions exist which could cause injury or death if someone comes into contact with the third rail. There is a need for a portable lightweight, highly visible cover board that fits a third rail application.

SUMMARY

Aspects of the disclosure relate to a portable, lightweight, non-conductive, and non-flammable hard lightweight cover that is placed over a third rail and used to protect workers from being electrocuted while working near live powered third rail system. Further, the third rail railway cover board may be highly visible and made to work in all weather conditions. Because of the simplicity of installation, no special power expert is needed to install the third rail railway cover board which will save a great deal of time and safety. The third rail railway cover board may include one or more of the following features: lightweight, non-conductive, and flame retardant; placed over high voltage third rail; weather and rain resistant; high-visibility; stackable; locking mechanism from one cover to an adjacent cover; LED light holder; contoured shape to fit all US third rail systems; and water shed design.

According to an embodiment, a railway cover board that is placed over a third rail and used to protect workers from being electrocuted while working near live powered third rail system may comprise a cover panel with a first edge and a second edge opposite the first edge, a first side panel extending from the first edge of the cover panel, and a second side panel extending from the second edge of the cover panel. The cover panel may include a handle to provide a structure for a worker to easily carry the railway cover board. The cover panel may include a secure locking mechanism on each of the ends of the cover panel, wherein the secure locking mechanisms allow a series of adjacent railway cover boards to be installed and connected together on the third rail. The secure locking mechanisms may define a protrusion from a top of the cover panel extending upward from the cover panel and thereby may define an indentation from a bottom of the cover panel extending downward from the cover panel.

Further, the railway cover board may include a material that is non-conductive and non-flammable; polypropylene flame-retardant halogen-free UL 94, V-0; highly visible; and/or weather and rain resistant. Additionally, the first side panel and the second side panel may extend approximately perpendicularly from a plane of the cover panel to provide a contoured shape. The secure locking mechanism may be utilized in a stacking and storage orientation of multiple third rail railway cover boards. The secure locking mechanism may be a truncated cone with a generally circular cross-sectional shape. The secure locking mechanism may include one or more sidewalls of the secure locking mechanism that are tapered with a truncated conical shape. Further, a wall thickness of the secure locking mechanism may be constant with a tapered angle of the protrusion of an upper railway cover board matches the indentation of a lower railway cover board. The first side panel and the second side panel may include a plurality of reflective sections and the plurality of reflective sections may include three rectangular reflective sections. Additionally, the handle may be defined by a rod imbedded in and spanning a central indentation in the cover panel.

According to another embodiment, a railway cover board that is placed over a third rail and used to protect workers from being electrocuted while working near live powered third rail system may comprise a cover panel with a first edge and a second edge opposite the first edge, a first side panel extending from the first edge of the cover panel, and a second side panel extending from the second edge of the cover panel. The cover panel may include a handle defined by a rod imbedded in an spanning a central indentation in the cover panel, the handle providing a structure for a worker to easily carry the railway cover board. The cover panel may include a secure locking mechanism on each of the ends of the cover panel, wherein the secure locking mechanisms allow a series of adjacent railway cover boards to be installed and connected together on the third rail. The secure locking mechanism may define a protrusion from a top of the cover panel extending upward from the cover panel and thereby defining an indentation from a bottom of the cover panel extending downward from the cover panel. Further, the secure locking mechanism may be utilized in a stacking and storage orientation of multiple third rail railway cover boards.

In yet another embodiment, a railway cover board that is placed over a third rail and used to protect workers from being electrocuted while working near live powered third rail system may comprise a cover panel with a first edge and a second edge opposite the first edge, a first side panel extending from the first edge of the cover panel, and a second side panel extending from the second edge of the cover panel. Additionally, the cover panel may include a handle defined by a rod imbedded in an spanning a central indentation in the cover panel, the handle providing a structure for a worker to easily carry the railway cover board. The first side panel and the second side panel may extend approximately perpendicularly from a plane of the cover panel to provide a contoured shape. The cover panel may include a secure locking mechanism on each of the ends of the cover panel. The secure locking mechanism may include a truncated cone with a generally circular cross-sectional shape. Additionally, the secure locking mechanisms may allow a series of adjacent railway cover boards to be installed and connected together on the third rail. The secure locking mechanisms may define a protrusion from a top of the cover panel extending upward from the cover panel and thereby defining an indentation from a bottom of the cover panel extending downward from the cover panel. Further, a wall thickness of the secure locking mechanism may be constant with a tapered angle of the protrusion of an upper third rail railway cover board matches the indentation of a lower third rail railway cover board. The secure locking mechanism may be utilized in a stacking and storage orientation of multiple third rail railway cover boards.

These features, along with many others, are discussed in greater detail below.

BRIEF DESCRIPTION OF THE DRAWINGS

FIG. 1 is a side perspective view of a third rail railway cover board in accordance with an embodiment of the present invention;

The reader is advised that the attached drawings are not necessarily drawn to scale.

DETAILED DESCRIPTION OF EMBODIMENTS

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three dimensional orientation of structures in order to fall within the scope of this invention.

Figure 2A:
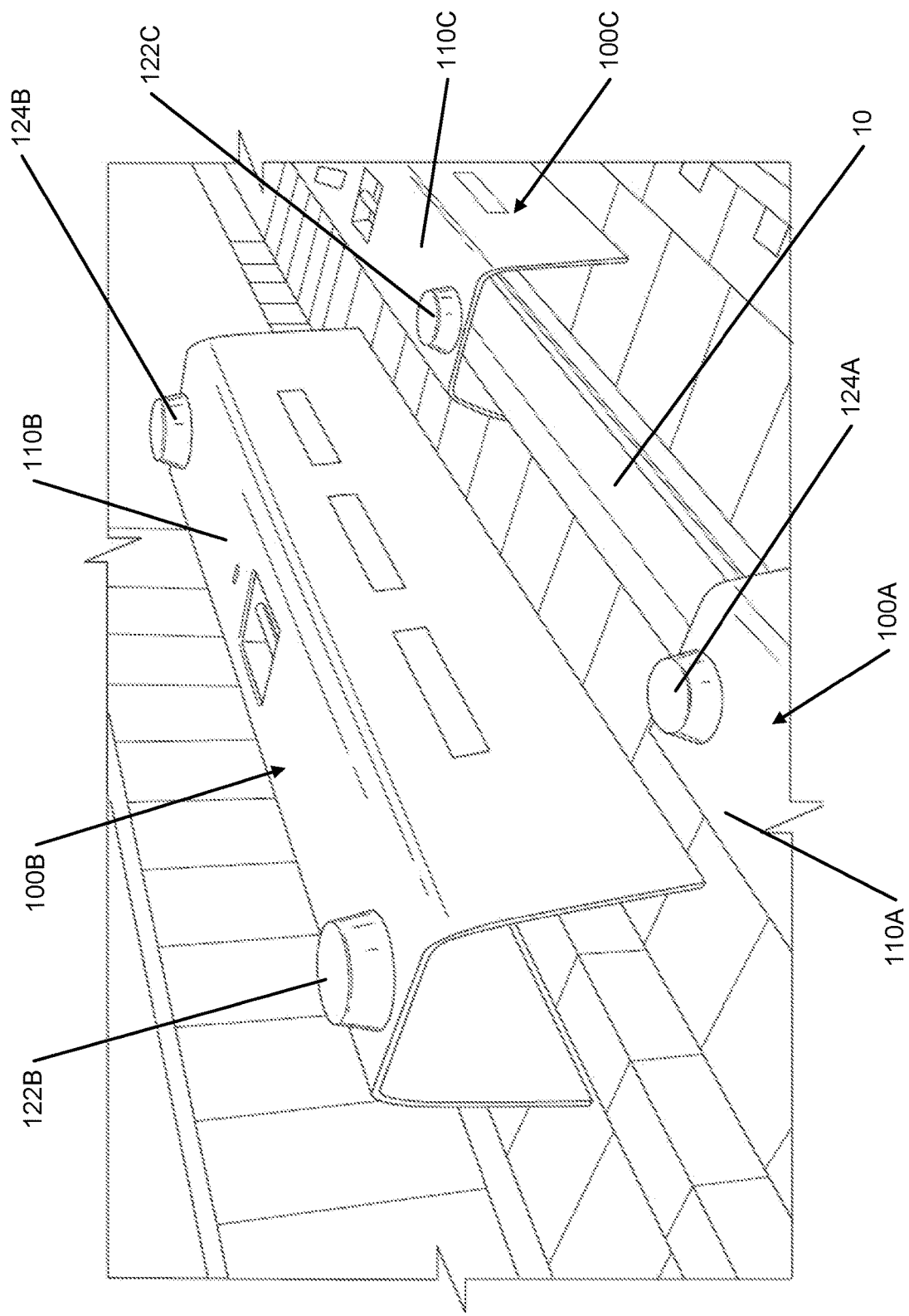
FIGS. 2A and 2B are side perspective views of the third rail railway cover board illustrated in FIG. 1 as installed within a railyard in accordance with an embodiment of the present invention.
Figure 2B:
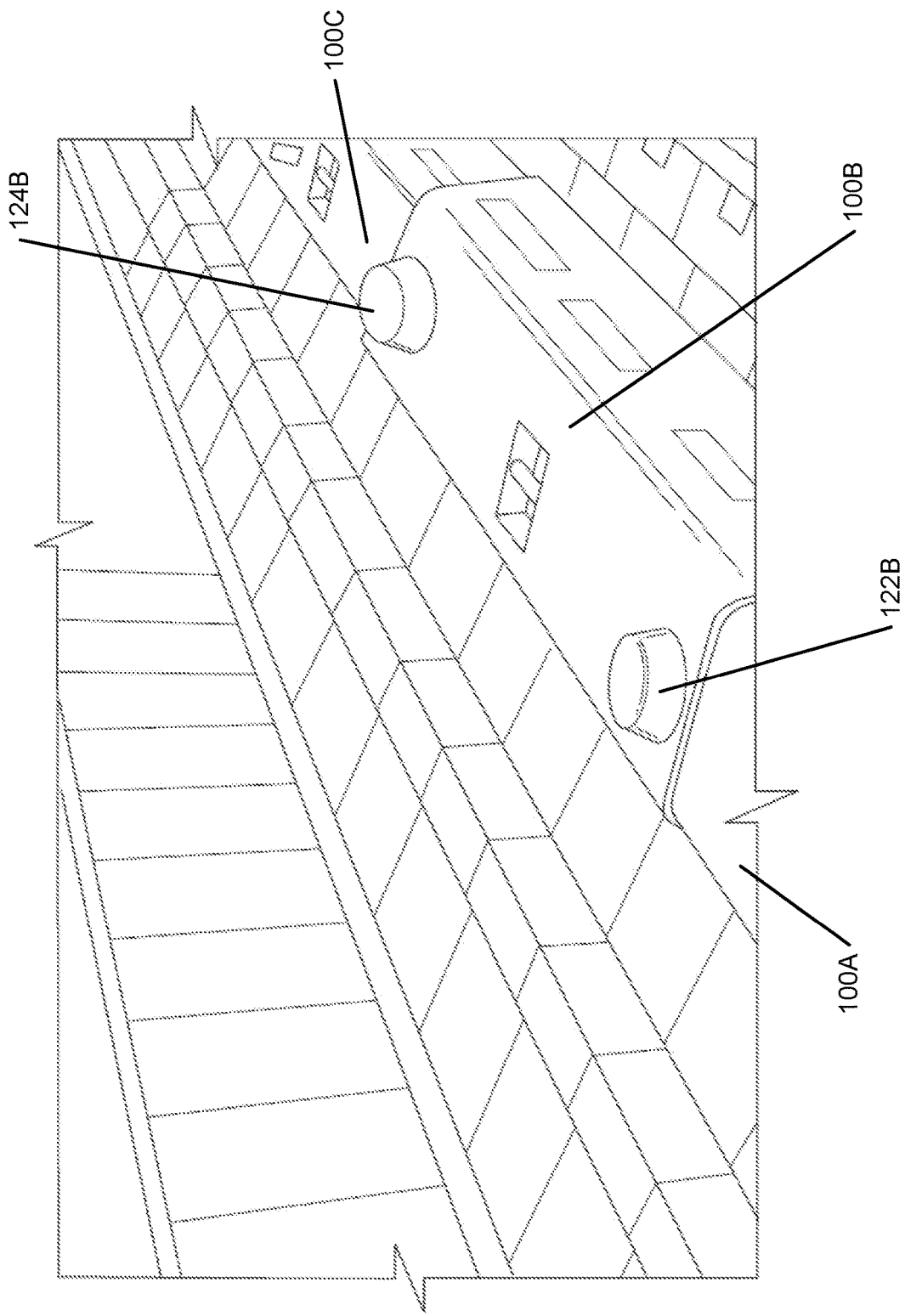
Figure 3:
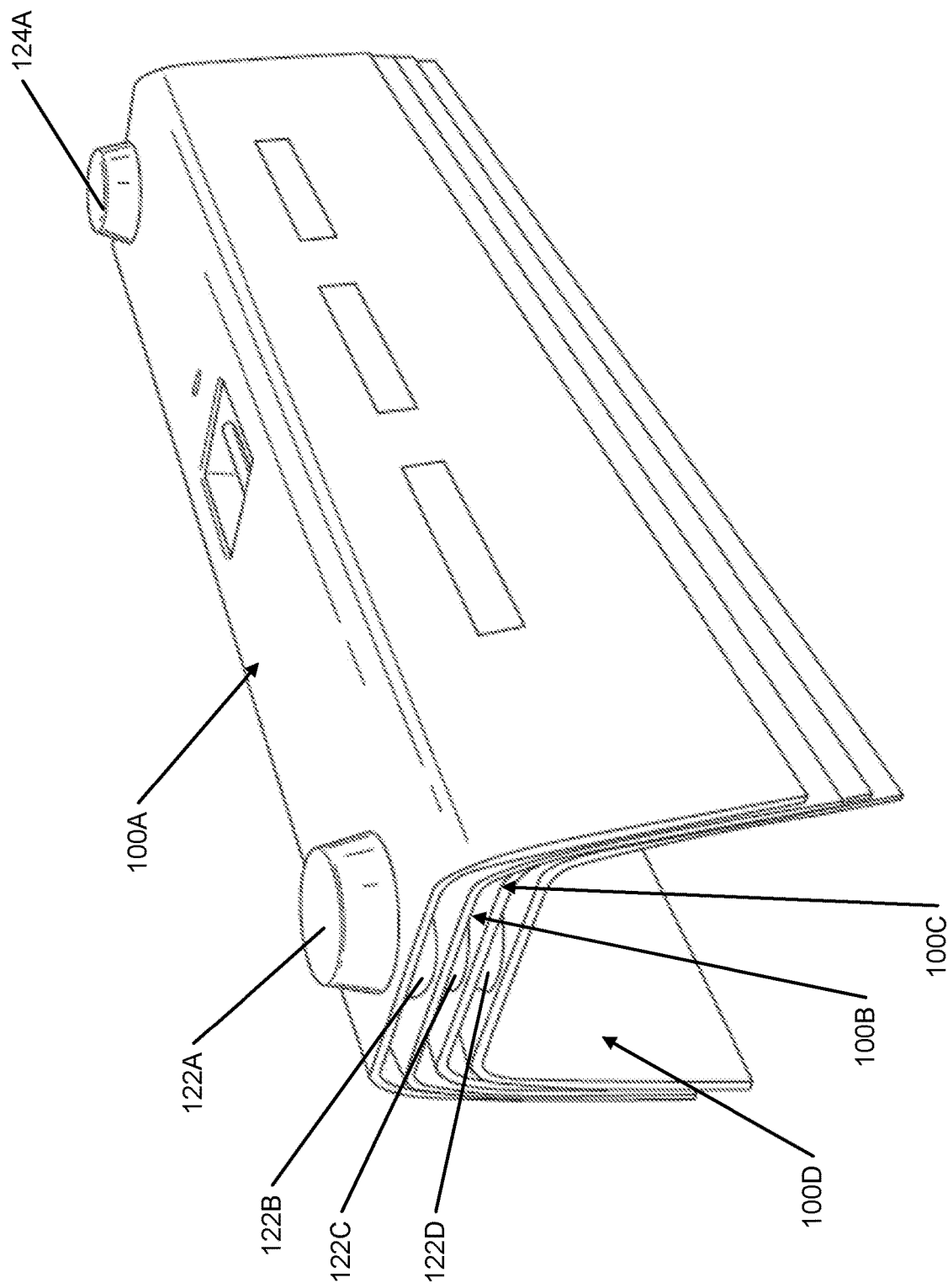
FIG. 3 is a side perspective view of the third rail railway cover board illustrated in FIG. 1 and stacked with other third rail railway cover boards in accordance with an embodiment of the present invention.

FIGS. 1-3 illustrate a portable lightweight non-conductive and non-flammable hard lightweight cover 100 that is placed over a third rail (600-750 VDC) 10 and used to protect workers from being electrocuted while working near live powered third rail system. The third rail railway cover board 100 may be made with polypropylene (PP) flame-retardant halogen-free UL94 V-0. Any novice worker can place this third rail railway cover board 100 on a third rail 10 without the concern of touching the third rail 10. The third rail railway cover board 100 may be highly visible and made to work in all weather conditions. Because of the simplicity of installation, no special power expert is needed to install the third rail railway cover board 100 which will save a great deal of time and safety. The third rail railway cover board 100 may include one or more of the following features: lightweight, non-conductive and flame retardant; placed over high voltage third rail; weather and rain resistant; high-visibility; stackable; locking mechanism from one cover to an adjacent cover; LED light holder; contoured shape to fit all US third rail systems; and water shed design.

FIGS. 1 through 3 illustrate a third rail railway cover board 100 that includes a cover panel 110 and two side panels 130, 132 extending from the cover panel 110. The cover panel 110 may include a first edge 112 and a second edge 114 opposite the first edge 112. A first side panel 130 extends from the first edge 112 of the cover panel 110 and a second side panel 132 extends from the second edge 114 of the cover panel 110. The side panels 130, 132 may extend approximately perpendicularly from the plane of the cover panel 110 to provide a contoured shape so that the third rail railway cover board 100 can be placed over all US third rail systems.

As illustrated in FIG. 1, the cover panel 110 may include an internal handle 116. The internal handle 116 may provide a structure for a worker to easily carry the third rail railway cover board 100. As illustrated in FIG. 1, the internal handle 116 may be a rod 118 imbedded in and spanning a central indentation 120 in the cover panel 110. The internal handle 116 may be any type carrying handle known and used in the art without departing from this invention.

Additionally, the cover panel 110 may include a secure locking mechanism 122, 124 on each of the ends of the cover panel 110. As illustrated in FIG. 2B, the secure locking mechanism 122, 124 may provide locking and stability for adjacent third rail railway cover boards 100. The secure locking mechanism 122, 124 may allow a series of third rail railway cover boards 100 be installed and connected together on the third rail. The secure locking mechanism 122, 124 of a first third rail railway cover board 100A may be connected with the secure locking mechanism 122, 124 of a second third rail railway cover board 100B. The secure locking mechanism 122, 124 provides a series of third rail covers 100 to be more easily installed on the third rail. As further illustrated in FIG. 2B, utilizing the secure locking mechanism 122, 124, a user can install a first cover board 100A and slide the first cover board 100A along the rail to install a second cover board 100B, locking the second cover board 100B to the first cover board 100A by placing the secure locking mechanism 122B from the second cover board 100B over the secure locking mechanism 124A on the first cover board 100A. The user can then slide the first cover board 100A and the second cover board 100B along the rail to install a third cover board 100C, locking the third cover board 100C to the second cover board 100B by placing the secure locking mechanism 122C from the third cover board 100C over the secure locking mechanism 124B on the second cover board 100B. This process may be utilized for as many as fifty third rail railway cover boards 100 in a row. The secure locking mechanism 122, 124 locks adjacent cover boards 100 to provide a sliding installation for the third rail railway cover boards 100 during the installation process.

Additionally, as illustrated in FIG. 3, the secure locking mechanism 122, 124 may further be utilized in a stacking and storage of third rail railway cover boards 100. For example, as shown in FIG. 3, a first cover board 100A may include a first secure locking mechanism 122A, 124A and may be set on top of a second cover board 100B with a second secure locking mechanism 122B, 124B which may be set on top of a third cover board 100C with a third secure locking mechanism 122C, 124C which may be set on top of a fourth cover board 100D with a fourth secure locking mechanism 122D, 124D. This stacking and storage of the third rail railway cover boards 100 may be utilized for as many as fifty third rail railway cover boards 100 stacked on top of each other.

The secure locking mechanism 122, 124 as illustrated in FIGS. 2A, 2B, and 3 may be various locking mechanisms without departing from this invention. For example, and as illustrated in FIGS. 2A, 2B, and 3, the secure locking mechanism 122, 124 may be a protrusion from the cover panel 110 extending upward and thereby creating an indentation in the cover panel 110 extending downward. As described above, when adjacent cover boards 100 or stacked cover boards 100, the protrusion of the bottom cover board extends into the indentation of the top cover board.

Additionally, in further detail, the secure locking mechanism 122, 124 may be a truncated cone with protrusions with a generally circular cross-sectional shape. The sidewalls of the secure locking mechanism 122, 124 may be tapered with a truncated conical shape. Additionally, a wall thickness of the secure locking mechanism may be constant so the tapered angle of protrusion of the upper cover board 100 matches the indentation of lower cover board 100, thereby easing the installation of adjacent cover boards 100 or stacking cover boards 100.

The side panels 130, 132 may include high-visibility features. As illustrated in FIG. 1, the side panels 130, 132 may include three different reflective sections 134 located along the side panels 130, 132. Other number of reflective sections 134 may be utilized on the side panels 130, 132 without departing from this invention. The reflective sections 134 as illustrated in FIG. 1 are rectangular in shape. The reflective sections 134 may be circular, oval, or square shaped without departing from this invention. Other shapes for the reflective sections may be utilized on the side panels 130, 132 without departing from this invention. Additionally, the third rail railway cover board 100 may be a highly visible color, such as orange, bright yellow, or neon green without departing from this invention.

It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

While the preferred embodiments of the invention have been shown and described, it will be apparent to those skilled in the art that changes and modifications may be made therein without departing from the spirit of the invention, the scope of which is defined by this description.

I claim:

1. A railway cover board that is placed over a third rail and used to protect workers from being electrocuted while working near live powered third rail system, the cover board comprising:
   a cover panel with a first edge and a second edge opposite the first edge, wherein the cover panel includes a handle;
   a first side panel extending from the first edge of the cover panel; and
   a second side panel extending from the second edge of the cover panel;
   wherein the cover panel includes a secure locking mechanism on each of the ends of the cover panel, the secure locking mechanisms configured to connect a series of adjacent railway cover boards together on the third rail;
   wherein the secure locking mechanisms include a protrusion extending upward from the cover panel, the protrusion defining an indentation in a bottom of the cover panel; and,
   wherein the cover panel intersects a base of the protrusion to define a closed perimeter at the intersection of the cover panel and the base of the protrusion.

2. The railway cover board of claim 1, wherein a material of the railway cover board is non-conductive and non-flammable.

3. The railway cover board of claim 1, wherein a material of the railway cover board is polypropylene flame-retardant halogen-free UL 94, V-0.

4. The railway cover board of claim 1, wherein a material of the railway cover board is highly visible.

5. The railway cover board of claim 1, wherein a material of the railway cover board is weather and rain resistant.

6. The railway cover board of claim 1, wherein the first side panel and the second side panel extend approximately perpendicularly from a plane of the cover panel to provide a contoured shape.

7. The railway cover board of claim 1, wherein the cover board is configured to be stacked with multiple railway cover boards.

8. The railway cover board of claim 1, wherein the secure locking mechanism is a truncated cone with a generally circular cross-sectional shape.

9. The railway cover board of claim 1, wherein the secure locking mechanisms are tapered.

10. The railway cover board of claim 1, wherein a wall thickness of the secure locking mechanism is constant with a tapered angle of the protrusion of an upper railway cover board matches the indentation of a lower railway cover board.

11. The railway cover board of claim 1, wherein the first side panel and the second side panel include a plurality of reflective sections and wherein the secure locking mechanisms do not extend past the first and second edges of the cover panel.

12. The railway cover board of claim 11, wherein the plurality of reflective sections include three rectangular reflective sections.

13. The railway cover board of claim 1, wherein the handle includes a rod imbedded in and spanning a central indentation in the cover panel.

14. A railway cover board that is placed over a third rail and used to protect workers from being electrocuted while working near live powered third rail system, the cover board comprising:
   a cover panel with a first edge and a second edge opposite the first edge, wherein the cover panel includes a handle defined by a rod imbedded in an spanning a central indentation in the cover panel, the handle providing a structure for a worker to easily carry the railway cover board;
   a first side panel extending from the first edge of the cover panel; and
   a second side panel extending from the second edge of the cover panel,
   and further wherein the cover panel includes a secure locking mechanism on each of the ends of the cover panel, wherein the secure locking mechanisms allow a series of adjacent railway cover boards to be installed and connected together on the third rail, wherein the secure locking mechanisms define a protrusion from a top of the cover panel extending upward from the cover panel and thereby defining an indentation from a bottom of the cover panel extending downward from the cover panel and further wherein the secure locking mechanism is utilized in a stacking and storage orientation of multiple railway cover boards.

15. The railway cover board of claim 14, wherein the first side panel and the second side panel extend approximately perpendicularly from a plane of the cover panel to provide a contoured shape.

16. The railway cover board of claim 14, wherein the secure locking mechanism is a truncated cone with a generally circular cross-sectional shape and the secure locking mechanism includes one or more sidewalls of the secure locking mechanism that are tapered with a truncated conical shape.

17. The railway cover board of claim 14, wherein a wall thickness of the secure locking mechanism is constant with a tapered angle of the protrusion of an upper railway cover board matches the indentation of a lower railway cover board.

18. The railway cover board of claim 14, wherein the first side panel and the second side panel include a plurality of reflective sections that include three rectangular sections.

19. A railway cover board that is placed over a third rail and used to protect workers from being electrocuted while working near live powered third rail system, the cover board comprising:

a cover panel with a first edge and a second edge opposite the first edge, wherein the cover panel includes a handle defined by a rod imbedded in an spanning a central indentation in the cover panel, the handle providing a structure for a worker to easily carry the railway cover board;

a first side panel extending from the first edge of the cover panel; and a second side panel extending from the second edge of the cover panel, wherein the first side panel and the second side panel extend approximately perpendicularly from a plane of the cover panel to provide a contoured shape;

and further wherein the cover panel includes a secure locking mechanism on each of the ends of the cover panel, the secure locking mechanism including a truncated cone with a generally circular cross-sectional shape, wherein the secure locking mechanisms allow a series of adjacent railway cover boards to be installed and connected together on the third rail, wherein the secure locking mechanisms define a protrusion from a top of the cover panel extending upward from the cover panel and thereby defining an indentation from a bottom of the cover panel extending downward from the cover panel, wherein a wall thickness of the secure locking mechanism is constant with a tapered angle of the protrusion of an upper railway cover board matches the indentation of a lower railway cover board, and further wherein the secure locking mechanism is utilized in a stacking and storage orientation of multiple railway cover boards.

20. The railway cover board of claim 19, wherein the first side panel and the second side panel include a plurality of reflective sections.

\* \* \* \* \*